Sept. 12, 1933.    P. B. RUTHERFORD    1,926,180
INDICATOR
Filed Sept. 10, 1931    2 Sheets-Sheet 1
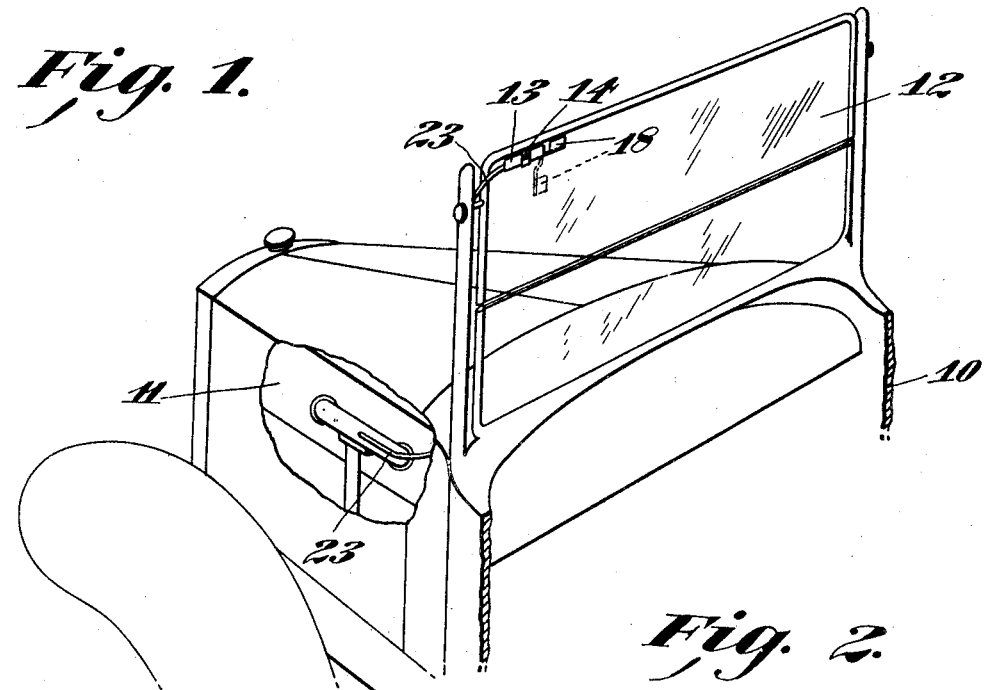
Fig. 1.
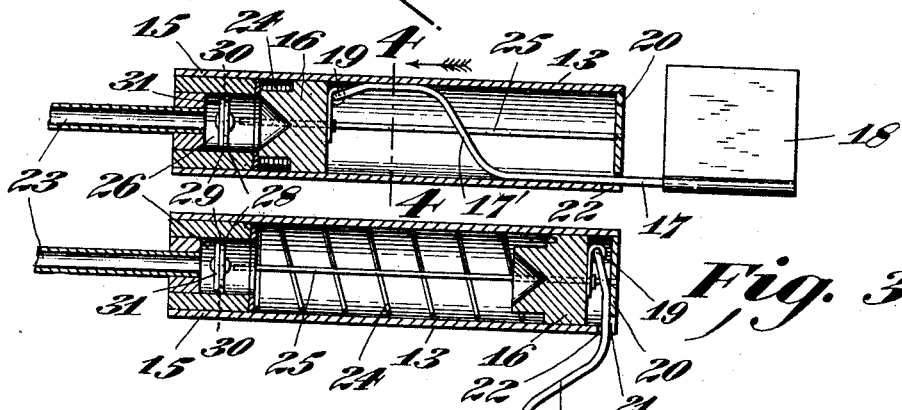
Fig. 2.
Fig. 3.
Fig. 4.
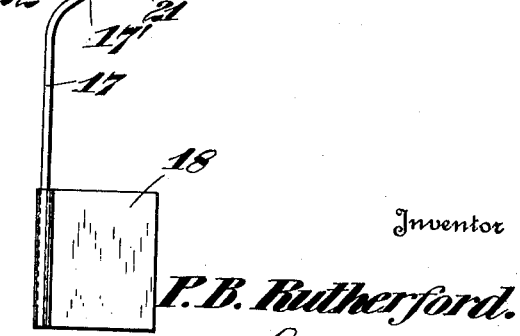
Inventor
P. B. Rutherford.
By Nevil Greenwell.
Attorney Sept. 12, 1933.   P. B. RUTHERFORD   1,926,180
INDICATOR
Filed Sept. 10, 1931    2 Sheets-Sheet 2
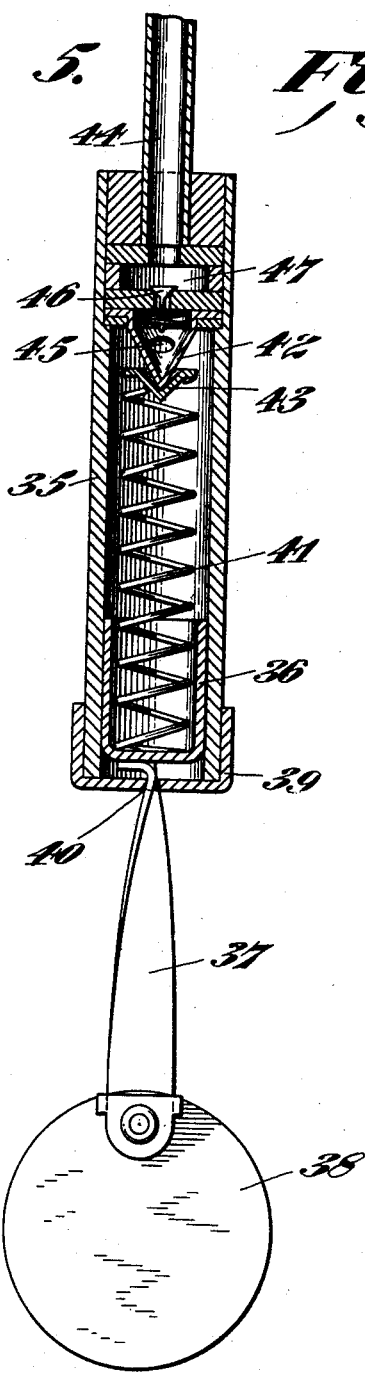
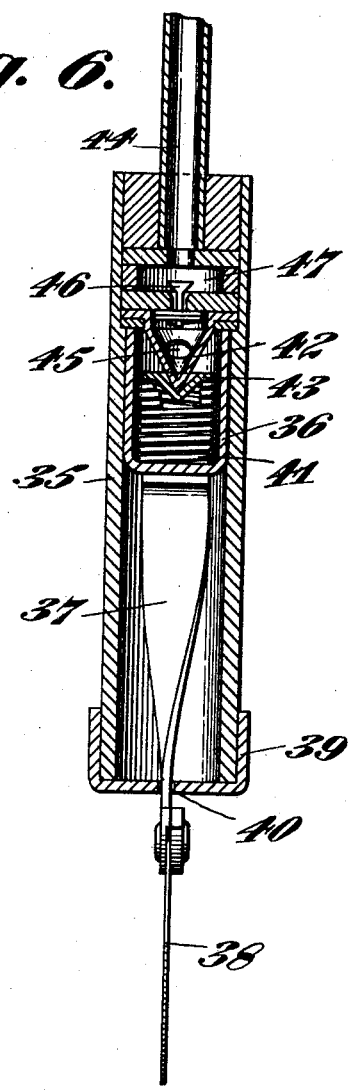
Inventor
P. B. Rutherford.
By Nevil Greenwell.
Attorney Patented Sept. 12, 1933

1,926,180

UNITED STATES PATENT OFFICE 1,926,180

INDICATOR

Peter B. Rutherford, Bethlehem, Pa.

Application September 10, 1931
Serial No. 562,039

14 Claims. (Cl. 116—114)

My invention relates to indicators and particularly to subatmospheric pressure controlled indicators.

One object of my invention is to provide an indicator which is particularly useful to indicate to the operator the condition of the motor of a motorized vehicle.

Another object of my invention is to provide a device which will immediately indicate to the operator the stoppage of the motor of a motorized vehicle.

A further object of my invention is to provide an indicator, which can be so placed that it normally will be substantially out of the driving vision of the operator of a motorized vehicle, but which will operate into the driving vision of the operator upon the stoppage of the motor.

In connection with the operation of motorized vehicles, the operator is often unaware of the stoppage of the motor until it is called upon to propel the vehicle. This is particularly true during the operation of vehicles in congested traffic and in operating the motorized vehicles using the free wheeling principle. When the motor stops while the vehicle is standing or during the free wheeling of the vehicle the operator is at times unaware of this fact until the motor is called upon to propel the vehicle, thus causing a great deal of inconvenience and possibility of considerable danger to life and property.

With my indicating device the above mentioned inconvenience and danger are more or less obviated, as my indicator will inform the operator, at all times, almost immediately, of the stoppage of the motor and the motor can then be restarted without delay, and in the case of vehicles using the free wheeling principle while the vehicle is still free wheeling.

The novel features of my invention will be more fully understood from the following description and claims taken with the drawings in which:

Fig. 1 is a sectional view of a motorized vehicle equipped with one form of my indicator, Fig. 2 is a sectional view of one form of my indicator, showing the indicating device in its non-indicating position, Fig. 3 is a sectional view similar to Fig. 2 but showing the indicating device in its indicating position, Fig. 4 is a sectional view taken on line 4—4 of Fig. 2, Fig. 5 is a sectional view of a modified form of my indicator showing the indicating device in its indicating position, and Fig. 6 is a sectional view similar to Fig. 5 but showing the indicating device in its non-indicating position.

Referring to the drawings: 10 designates a motor operated vehicle, 11 the motor, 12 a windshield, and 13 an indicator which is an embodiment of my invention. The indicator 13 is shown mounted on the windshield 12 by means of a clip 14 which is attached to the windshield by any suitable means.

In the preferred form, my indicator 13, as shown in Figs. 1 to 4, inclusive, comprises a cylindrical member 15, having a piston 16 reciprocatively mounted therein. An arm 17, having an indicating device 18 attached thereto, is operatively connected to the piston 16, preferably by the hinged joint 19, although it may be connected by any other well known flexible or hinged joint. A closure member 20 is provided for one end of the cylinder 15 and is provided with a slot 21 through which the arm 17 projects to the outside of the cylinder 15. A communicating slot 22 is provided in the cylinder 15 to permit the arm 17 to operate angularly during the movement of the piston. The piston 16 is constrained towards the position indicated in Fig. 3 by means of the spring 24 and is operated to and retained in the position indicated in Fig. 2 by atmospheric pressure. The latter is made effective to move the piston 16 and to overcome the spring 24 by creating a subatmospheric pressure in the end 26 of the cylinder 15. This subatmospheric pressure is created by the motor of the vehicle and to this end the end 26 of the cylinder 15 is communicated with the intake manifold of the motor or the so-called vacuum system of a motorized vehicle by means of the conduit 23. Means such as the guide 25, may be provided to prevent the piston from rotating during its travel from one end to the other end of the cylinder 15 so that the arm 17 will always be retained in its correct position relative to the slot 21.

A check valve 28 is provided in the cylinder 15, and comprises a disc 29, having openings 30 therein, and a flexible member 31. The latter is designed so as to uncover the openings 30 when subatmospheric pressure is present in the end 26 of the cylinder 15, and to close the openings due to the absence of subatmospheric pressure in the end 26 of the cylinder 15.

The indicator is mounted in close proximity to the margin of the windshield so that when the indicating device 18 is in its indicating position as shown in Fig. 3, it will be across a portion of the windshield in the driving vision of the operator of the vehicle as indicated in dotted lines in Fig. 1.

The indicator, while shown mounted on the windshield, may be mounted on the frame thereof or on any member of the vehicle in close proximity to the margin of the windshield so that the indicating device will pass across a portion of the windshield in front of the operator of the vehicle.

In operation, when the motor of the vehicle is in operation, the indicator is in its normal non-indicating condition as shown in full lines in Fig. 1 and Fig. 2. That is with the piston 16 near the end 26 of the cylinder 15 and the spring 24 compressed due to subatmospheric pressure being present in the end 26 of the cylinder 15. Upon the stoppage of the motor the pressure in the end 26 of the cylinder 15 will be raised substantially to atmospheric pressure and the spring 24 will immediately carry the piston 18 to the position indicated in Fig. 3. As the arm 21 is operatively connected to the piston 16 it will be carried forward with the piston and the hinged connection between the piston and the arm permits gravity and/or the action of the cam portion 17' with the end of slot 21 to move the arm 17 angularly during the travel of the piston until it is substantially at right angles to its non-indicating position, as shown in Fig. 3, and in broken lines in Fig. 1, and thus indicate to the operator that the motor has stopped. Immediately upon the starting of the motor the piston 16 will operate and automatically return the indicating device 18 to its non-indicating position.

The modified form of indicator shown in Figs. 5 and 6 comprises a cylindrical member 35 having a piston 36 reciprocatively mounted therein. An arm 37 having an indicating device 38 attached thereto is operatively connected to the piston and moves therewith. A closure member 39 is provided for one end of the cylinder. This member is provided with a slot 40 through which the arm 37 slides. The arm 37 is twisted so that in moving through the slot 40, during the travel of the piston from one extreme position to the other in the cylinder, it will turn through an angle so that the indicating device 38 will be turned from the position shown in Fig. 5 to the position shown in Fig. 6, that is substantially at right angles to the former position. A spring 41, which is pivotally mounted on the member 42 by means of the member 43 is provided to constrain the arm 37 towards its outermost position. The arm is operated to and retained in its innermost or non-indicating position by atmospheric pressure imposed on the outer side of the piston 36, which is rendered effective due to subatmospheric pressure being created in the cylinder at the inner side of the piston in the manner as set forth with reference to the first form described above. The member 42 is provided with passages 45 to establish communication between the cylinder and the conduit 44.

A check valve 46 is provided in the cylinder 35. This valve is adapted to open upon the presence of subatmospheric pressure in the end 47 of the cylinder 35 and to close upon the absence of subatmospheric pressure in the end 47 of the cylinder.

The operation of this modified form of indicator is similar to that shown in Figs. 1 to 4, inclusive, except that the operation of the arm 37 is different. Normally, when the motor is in its operative condition the indicating device 38 is in the position shown in Fig. 6, that is adjacent the cylinder 35 with its narrow edge towards the operator of the vehicle due to subatmospheric pressure controlling the piston 36. Upon the stoppage of the motor the pressure in the end 47 of the cylinder 35 will be raised substantially to atmospheric pressure and the spring 41 will immediately carry the piston 36 and the indicating device which is operatively attached thereto to the position shown in Fig. 5. In the travel of the piston from the position shown in Fig. 6 to the position shown in Fig. 5 the arm 37 due to the twist therein will cause the indicating device 38 to revolve through an angle to the position shown in Fig. 5, that is, at substantially right angle to its former position so that the face of the device is now in full view of the operator. As soon as the motor is started the device will resume the position shown in Fig. 6.

It will therefore be seen that I have devised an indicator which will inform the operator of a motorized vehicle of the stoppage of the motor, which is entirely automatic in its operation and after once being installed will require no further attention, and which will always be in readiness for operation.

Having thus described my invention what I claim and desire to secure by Letters Patent is:

1. In combination with a motorized vehicle having a windshield, of means, comprising a motor, for driving said vehicel and for producing subatmospheric pressure, an indicator mounted in close proximity to the margin of said windshield for indicating to the operator of the vehicle the condition of said motor, said indicator comprising a member having an indicating and a non-indicating position and movable across a portion of the windshield, and means controlled by the subatmospheric pressure produced by said motor for retaining the aforementioned member in its non-indicating position.

2. In combination with a motorized vehicle, of means, comprising a motor, for driving said vehicle and for producing subatmospheric pressure, an indicator for indicating to the operator of the vehicle the condition of said motor, said indicator comprising a member having an indicating and a non-indicating position and movable across a portion of the windshield, means controlled by the subatmospheric pressure produced by said motor for retaining the aforementioned member in its non-indicating position, and means for automatically operating said member to its indicating position upon failure of the subatmospheric pressure producing means.

3. In combination with a motorized vehicle, an indicator for informing the operator thereof of the condition of the motor, said indicator comprising an element normally withheld substantially from the normal driving vision of the operator by subatmospheric pressure controlled by the motor and movable across a portion of the windshield upon stoppage of the motor, and means for operating said element to within the driving vision of the operator upon the stoppage of the motor.

4. An indicator comprising a cylinder, a piston reciprocatively mounted in said cylinder, an arm having a signaling device connected thereto and operatively connected to said piston, a closure for one end of said cylinder having a slot therein through which said arm projects, guide means for said arm adjacent said slot and means on said arm adapted to engage said guide means and move said arm angularly with respect to said cylinder upon reciprocation of said piston.

5. In combination with a motorized vehicle having a windshield, of means, comprising a motor, for driving said vehicle and for producing subatmospheric pressure, an indicating device controlled by said subatmospheric pressure adapted to move automatically across a portion of the windshield upon the stoppage of said motor.

6. An indicator mounted in close proximity to the margin of the windshield of a vehicle having a subatmospheric pressure producing means, said indicator having a device capable of movement across a portion of the windshield to indicating and non-indicating positions, means for connecting said subatmospheric pressure producing means to said indicator, a piston reciprocatively mounted in said indicator, and operatively connected to the aforementioned device adapted to be controlled by subatmospheric pressure to retain said device in its non-indicating position during the operation of said subatmospheric pressure producing means and means for automatically reciprocating said piston and moving said device to indicating position, upon the failure of the subatmospheric pressure producing means.

7. In combination with a vehicle, a motor, a windshield, and an indicator mounted in close proximity to the margin of said windshield continuously effective to automatically move across a portion of the windshield to inform the operator of the vehicle of the stoppage of said motor.

8. In combination with a vehicle having a windshield, a motor for driving said vehicle and an indicating device mounted on said vehicle and movable across a portion of the windshield for indicating continuously to the operator of the vehicle the operative condition of said motor.

9. In combination with a vehicle, a motor, a windshield, and an indicator mounted in close proximity to the margin of said windshield adapted to inform the operator of the vehicle of the stoppage of said motor, said indicator comprising an indicating device movable automatically across a portion of the windshield upon the stoppage of the motor.

10. An indicator comprising a body having a chamber, a piston within said chamber, a signaling device hinged to said piston, and means constantly urging said device towards signaling position.

11. An indicator comprising a body having a chamber and a shoulder portion, a movable piston within said chamber, a spring urging said piston toward one end of the chamber, and a signaling device hinged to said piston, said device comprising a rod member having a camming portion to engage said shoulder to move said rod member angularly upon movement of said piston.

12. An indicator comprising a body having a chamber, a closure for said chamber, a slot in said closure, a piston within said chamber, a signaling device, and a twisted arm of helical formation passing through the slot in the closure connecting said signaling device to said piston.

13. In combination with a motorized vehicle having a windshield, of means comprising a motor for driving said vehicle, a signaling device mounted on said vehicle, said device comprising means normally withheld substantially out of the driving vision of the operator during the operation of the motor and operatable automatically across a portion of the windshield to signal the operator upon the stoppage of the motor.

14. An indicator comprising, a cylinder, a piston within said cylinder, means to move said piston, an indicating member, one end of said cylinder constituting a support for said member when the piston is at the other end of said cylinder, and a hinged connection between said piston and said member whereby when the piston is moved said support becomes ineffective and the member is permitted to move angularly with respect to said piston.

PETER B. RUTHERFORD.